(12) United States Patent
Shafer et al.

(10) Patent No.: US 7,527,736 B2
(45) Date of Patent: *May 5, 2009

(54) METHOD FOR GENERATING FRACTURING WATER

(75) Inventors: Lee L. Shafer, Big Piney, WY (US);
John W. James, Boulder, WY (US);
Richard D. Rath, Larkspur, CO (US);
Jesse Eubank, LaBarge, WY (US)

(73) Assignee: Anticline Disposal, LLC, Rapid City, SD (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/685,681

(22) Filed: Mar. 13, 2007
(Under 37 CFR 1.47)

(65) Prior Publication Data

US 2008/0058576 A1    Mar. 6, 2008

Related U.S. Application Data

(60) Provisional application No. 60/767,574, filed on Sep. 1, 2006.

(51) Int. Cl.
*C02F 3/00* (2006.01)
(52) U.S. Cl. .................. 210/620; 210/621; 210/622; 210/630; 210/631
(58) Field of Classification Search ......... 210/620–622, 210/630–631
See application file for complete search history.

(56) References Cited

U.S. PATENT DOCUMENTS

| | | | |
|---|---|---|---|
| 3,254,719 A | | 6/1966 | Root |
| 4,152,274 A | | 5/1979 | Phillips |
| 4,889,638 A | * | 12/1989 | Rockford et al. ............ 210/703 |
| 4,983,297 A | * | 1/1991 | Kaczmarek et al. ......... 210/605 |
| 5,006,249 A | * | 4/1991 | Green et al. ................ 210/603 |

(Continued)

FOREIGN PATENT DOCUMENTS

WO    WO 2006/110574    10/2006

OTHER PUBLICATIONS

Funston, R., et al., Kennedy/Jenks Consultants, 200 New Stine Road, Suite 205, Bakersfield, CA 93309, "Evaluation of Technical and Economic Feasiblity of Treating Oilfield Produced Water to Create a "New" Water Resource," pp. 1-14.

(Continued)

*Primary Examiner*—Chester T Barry
(74) *Attorney, Agent, or Firm*—Merchant & Gould, P.C.

(57) ABSTRACT

Systems and methods have been developed for reclaiming water contaminated with the expected range of contaminants typically associated with produced water in order to produce a treated water having a quality adequate for reuse as a fracturing water. The system includes anaerobically digesting the contaminated water, followed by aerating the water to enhance biological digestion. After aeration, the water is separated using a flotation operation that effectively removes the spent friction reducing agents and allows the treated water to be reclaimed and reused as fracturing water, even though it retains levels of contaminants, including boron and methanol, that would prevent its discharge to the environment under existing standards. The treated water has had a sufficient amount of the gellation-inhibiting contaminants, such as acrylamide friction reducing compounds, removed to allow the treated water to be an economically viable fracturing water.

11 Claims, 1 Drawing Sheet

U.S. PATENT DOCUMENTS

| | | | | |
|---|---|---|---|---|
| 5,656,173 | A | * | 8/1997 | Jordan et al. .............. 210/703 |
| 2004/0031742 | A1 | * | 2/2004 | Arnaud .................... 210/259 |
| 2007/0051513 | A1 | * | 3/2007 | Heins ..................... 166/265 |
| 2007/0102359 | A1 | * | 5/2007 | Lombardi et al. ......... 210/639 |

OTHER PUBLICATIONS

Huang, F., et al., "Feasibility of Using Produced Water for Crosslinked Gel-Based Hydraulic Fracturing," 2005 SPE Production and Operations Symposium, Oklahoma City, OK, U.S.A., Apr. 17-19, 2005.

Lawrence, A.W., et al., "Evaluation of produced water management option in the natural gas production industry," the SPEC/EPA Exploration and Production Environmental Conference, San Antonio, TX, USA, Mar. 7-10, 1993, pp. 581-595.

Morales, M., et al., "Desalination of Produced Water Using Reverse Osmosis," GasTips, vol. 8, No. 3, pp. 13-15, Summer 2002.

Nable, Ross. O., et al., *Plant and Soil*, 193: 181-198, 1997.

Novachis, Lawrence, "Design and Operation of Membrane Bioreactor Technology for Industrial and Municipal Wastewater Treatment," WEFTEC 1998 Pre-Conference Workshop, Membrane Technology: Physical and Biological Treatment of Industrial Wastewaters, pp. 1-13.

Tsang, Patrick B., et al., "Economic Evaluation of Treating Oilfield Produced Water for Potable Use," SPE International Thermal Operations and Heavy Oil Symposium and Western Regional Meeting, Bakersfield, CA, U.S.A., Mar. 16-18, 2004.

BJ Services Company, Material Safety Data Sheet, "MSDS for FRW-14", pp. 1-4. [Date unknown].

Borax™, Agronomy Notes [online]. Borax, 2005, "Relative Plant Tolerance to Available Boron Supply". [retrieved on the internet on Nov. 9, 2007] <http://www.borax.com/agriculture/files/an406.pdf>.

Dow Chemical Company™, Product Information Sheet, Form No. 177-01997-1103, "XUS-43594.00 A Uniform Particle Size Weak Base Anion Exchange Resin for Selective Boron Removal", pp. 1-2. [Date unknown].

Purolite Ion Exchange Resins, (flyer) "S-108 Boron Selective Anion Exchange Resin (for the removal of boron salts from aqueous solutions)", Form S108_TB/0599, pp. 1-4. [Date unknown].

Sybron Chemicals Inc., a Lanxess Company, Sybron Chemical Products, Product Information, Lewatit™ MK 51, [retrieved online on Nov. 9, 2007] <http://www.sybronchemicals.com/products/selective/index.html>.

USDA, Agricultural Research Service, US Salinity Laboratory, "Boron Tolerance Limits for Agricultural Crops" [online]. [retrieved on the internet on Nov. 9, 2007] <http://www.ussl.ars.usda.gov/pls/caliche/BOROT46>.

Zenon Environmental Inc., "The ZeeWeed™ Process Description", Section 1, pp. 1-6, Mar. 18, 2003.

ZeroNet Perspective, Produced Water Project, San Juan Generating Station, power point presentation. [Date unknown].

\* cited by examiner

METHOD FOR GENERATING FRACTURING WATER

RELATED APPLICATIONS

This application claims the benefit of U.S. Provisional Application No. 60/767,574, filed Sep. 1, 2006, which application is hereby incorporated herein by reference.

BACKGROUND

Water, especially in the western United States and other arid regions, is a valuable resource. Many oil and natural gas production operations generate, in addition to the desired hydrocarbon products, large quantities of waste water, referred to as "produced water". Produced water is typically contaminated with significant concentrations of chemicals and substances requiring that it be disposed of or treated before it can be reused or discharged to the environment. Produced water includes natural contaminants that come from the subsurface environment, such as hydrocarbons from the oil- or gas-bearing strata and inorganic salts. Produced water may also include man-made contaminants, such as drilling mud, "frac flow back water" that includes spent fracturing fluids including polymers and inorganic cross-linking agents, polymer breaking agents, friction reduction chemicals, and artificial lubricants. These contaminants are injected into the wells as part of the drilling and production processes and recovered as contaminants in the produced water.

Commonly encountered non-natural contaminants in produced water, and their sources, are discussed below.

From high-viscosity fracturing operations—gellants in the form of polymers with hydroxyl groups, such as guar gum or modified guar-based polymers; cross-linking agents including borate-based cross-linkers; non-emulsifiers; and sulfate-based gel breakers in the form of oxidizing agents such as ammonium persulfate.

From drilling fluid treatments—acids and caustics such as soda ash, calcium carbonate, sodium hydroxide and magnesium hydroxide; bactericides; defoamers; emulsifiers; filtrate reducers; shale control inhibitors; deicers including methanol and thinners and dispersants.

From slickwater fracturing operations—viscosity reducing agents such as polymers of acrylamide.

Because of the very wide range of contaminant species as well as the different quality of produced water from different sources, efforts to create a cost effective treatment system that can treat or recycle the spectrum of possible produced water streams have little success. For example, while reverse osmosis is effective in treating many of the expected contaminants in produced water, it is not very effective in removing methanol and it may be fouled by even trace amounts of arcylamide.

As another example, there have been many attempts to reclaim produced water and reuse it as fracturing feed water, commonly referred to as "frac water." Frac water is a term that refers to water suitable for use in the creation of fracturing (frac) gels which are used in hydraulic fracturing operations. Frac gels are created by combining frac water with a polymer, such as guar gum, and in some applications a cross-linker, typically borate-based, to form a fluid that gels upon hydration of the polymer. Several chemical additives generally will be added to the frac gel to form a treatment fluid specifically designed for the anticipated wellbore, reservoir and operating conditions.

However, some waste water streams are unsuitable for use as frac water in that they require excessive amounts polymer or more to generate the high-viscosity frac gel. For example, trace amounts of spent friction reducers in the stream inhibit the added polymer from gelling. Because it can be difficult to prevent produced water streams from different sources from being co-mingled, this typically results in all produced water from a well field being made unsuitable for recycling as frac water.

An additional problem occurs when the produced water is also contaminated with methanol and it is desirable to discharge the water to the environment. One way to treat produced water to the extent necessary to discharge the water to the environment, is through filtration techniques such as ultra filtration and reverse osmosis. However, methanol will pass through nearly any available membrane filtration technology.

Yet another problem occurs when the produced water is also contaminated with boron, such as from the use of borate-based cross-linking agents, and it is desirable to discharge the water to the environment. One way to treat produced water with boron is referred to as the HERO® process in which the pH is raised up to at least about 11 prior to treatment with reverse osmosis, resulting in the boron being rejected with the reverse osmosis reject brine. However, raising the pH has several undesirable attributes. First, there is increased scaling within the reverse osmosis system increasing the maintenance costs of the system. Second, the pH must then be reduced before the treated water may be discharged to the environment. Third, the cost of the chemicals to raise the pH coupled with the cost of immediately thereafter lowering the pH and the cost of disposal of the precipitated salts resulting from the lowering of the pH make the HERO process very expensive.

SUMMARY

Systems and methods have been developed for reclaiming water contaminated with the expected range of contaminants typically associated with produced water in order to produce a treated water having a quality adequate for reuse as a fracturing water. The system includes anaerobically digesting the contaminated water, followed by aerating the water to enhance biological digestion. After aeration, the water is separated using a flotation operation that effectively removes the spent friction reducing agents and allows the treated water to be reclaimed and reused as fracturing water, even though it retains levels of contaminants, including boron and methanol, that would prevent its discharge to the environment under existing standards. The treated water has had a sufficient amount of the gellation-inhibiting contaminants, such as acrylamide friction reducing compounds, removed to allow the treated water to be an economically viable fracturing water.

In part, this disclosure describes method for generating fracturing water from produced water. The method includes transferring produced water contaminated with at least one contaminant selected from a friction reducer and a fracturing polymer into an anaerobic pond. The produced water is held in the anaerobic pond for at least a first mean residence time and then transferred from anaerobic pond effluent to an aeration pond. The method includes aerating the anaerobic pond effluent in the aeration pond for a second mean residence time and then transferring aeration pond effluent from the aeration pond to a dissolved air flotation treatment system. The method then floats the aeration pond effluent with the dissolved air flotation treatment system to generate a floated aqueous effluent and a separated solids effluent. The method then includes providing the floated aqueous effluent as fracturing water to a fracturing fluid generation system.

In part, this disclosure describes a system for reclaiming produced water contaminated with at least one friction reducing agent. The system includes an anaerobic digestor that receives the produced water and holds at least a portion of the produced water under anaerobic conditions and discharges an anaerobic digestor effluent. The system further includes an aerator that aerates the anaerobic digestor effluent and discharges an aerator effluent. The system also includes a flotation separator that separates contaminants from the aerator effluent to produce a reclaimed water stream suitable for use as fracturing water.

In part, this disclosure describes a method for removing contaminants from produced water that inhibit the gelling of fracturing fluid when the produced water is used as fracturing water. The method includes anaerobically digesting the produced water containing the contaminants for a first period of time. After anaerobically digesting the produced water, the produced water is aerated for a second period of time. After aerating the produced water, the produced water is treated in a dissolved air flotation system. The effluent of the dissolved air flotation system is then filtered to generate a filtered water that is suitable for use as fracturing water.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Figure 1:
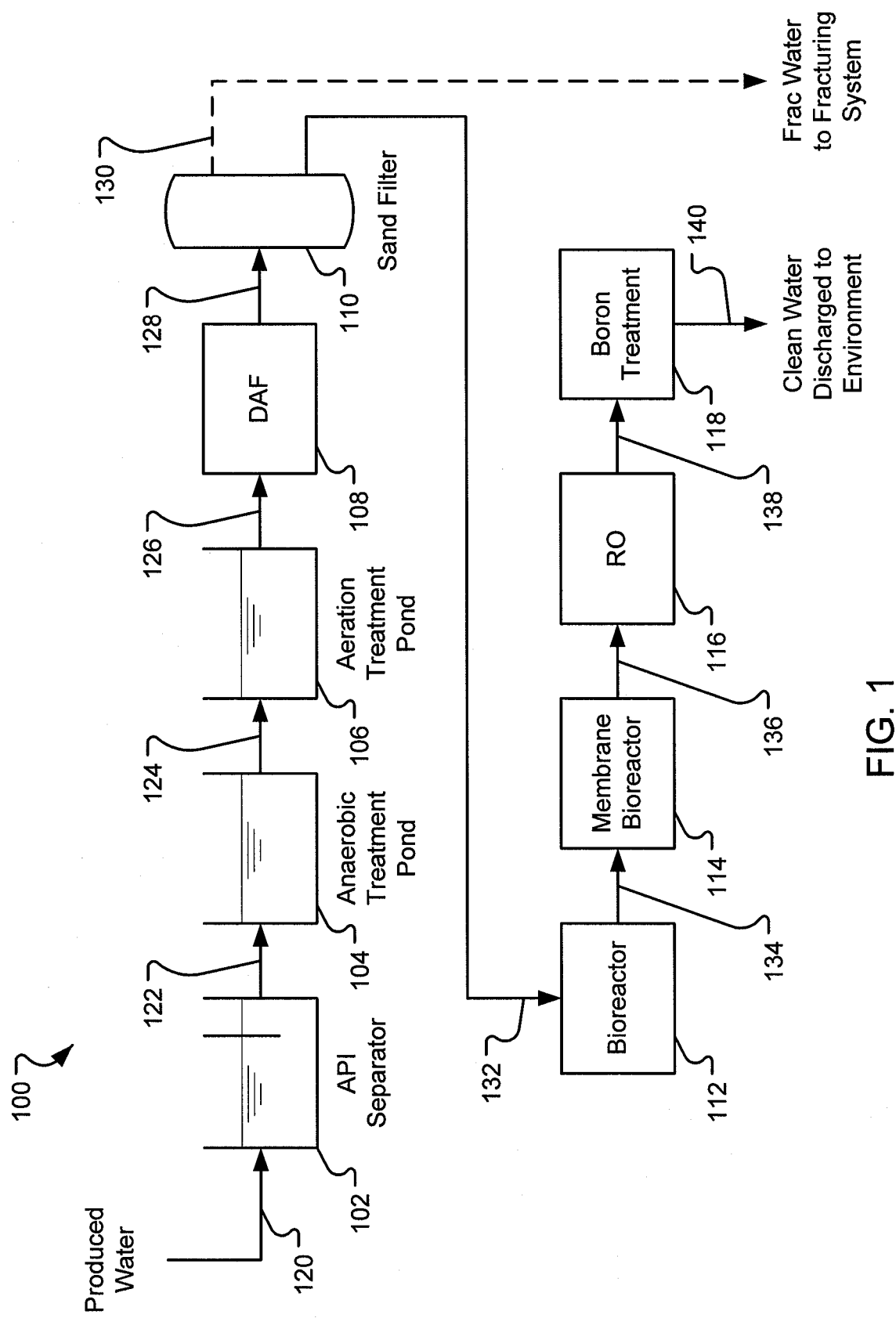
FIG. 1 illustrates an embodiment of a system for treating contaminated water.

Unless otherwise indicated, all numbers expressing quantities of ingredients, properties such as molecular weight, concentrations, reaction conditions, temperatures, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in the light of the number of reported significant digits and by applying ordinary rounding techniques.

The term "residence time" refers to the average length of time that a fluid or particle spends within a process vessel or in contact with a catalyst. For the purposes of this discussion, the mean residence time of a vessel is defined by dividing the volume of liquid in a vessel (e.g., volume in cubic feet) by the volumetric flow rate of the liquid (e.g., in cubic feet per second).

The term "floating" as used herein refer to treating a liquid with a flotation operation to separate solid or liquid particles from a liquid phase. There are several types of flotation operations that are well known in the art including dissolved-air flotation (DAF), air flotation and vacuum flotation.

Fracturing gel or "frac gel" refers to a high-viscosity gel fluid mix for use in fracturing a subterranean formation. The term "fracturing gel" will be used herein to refer to a fluid having a viscosity greater than about 100 centipoise when injected into the subsurface for the purpose of fracturing the subsurface formations. The term "Fracturing water," as discussed above, refers to the water to which the gellant is added in order to create the fracturing gel. For the purposes of this disclosure, however, a water is suitable for use as fracturing water if it can be mixed with an economical amount of guar gum, relative to other clean water supplies, to create a frac gel. That is, a water is not suitable for use as fracturing water if it requires significantly more polymer (in order to achieve target properties of the frac gel) than other sources of water readily available. Thus, for the purposes of this disclosure, a water is considered suitable for use as fracturing water only if it can be mixed with an amount of polymer (e.g., guar gum, guar gum derivatives, or other commonly applied gelling agent in the fracturing industry, that will create a frac gel) to create a frac gel having a stable viscosity greater than about 50 centipoise at the injection temperature, and the amount of gelling agent required is no more than about 10% greater than that amount required to create the same viscosity using an equivalently salty water, i.e., distilled water mixed with an equivalent amount of salt content as the purported fracturing water.

Slick water, on the other hand, refers to a relatively low viscosity aqueous fluid used also for fracturing a subterranean formation. The term "slick water" as used herein further refers to low viscosity (i.e., a viscosity less than that used for frac gels) fluid to which friction reduction agents have been added to modify the flow characteristics of the fluid. For example, slick water is often created by adding a small amount of polymer to water in order to change the flow characteristics of the resulting aqueous mixture. Such friction reduction agents include, but are not limited to, polyvinyl polymers, polymethacrylamides, cellulose ethers, polysaccharides, lignosulfonates, and ammonium, alkali metal, and alkaline earth salts thereof. Specific examples of typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinly acetate, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar, carboxymethyl hydroxypropyl guar, and carboxymethyl guar), heteropolysaccharides obtained by the fermentation of starch-derived sugar (e.g., xanthan gum), and ammonium and alkali metal salts thereof. Preferred water-soluble polymers include hydroxyethyl cellulose, starch, scleroglucan, galactomannans, and substituted galactomannans. For example, copolymers of acrylamides are disclosed as good friction reduces in U.S. Pat. No. 3,254,719 and U.S. Pat. No. 4,152,274, which disclosures are hereby incorporated herein by reference. An example of an acrylamide-based friction reducer includes that sold under the product name FRW-14 by BJ SERVICES COMPANY. Others are well known in the art.

It should be noted that both fracturing fluids and slick water may include other compounds such as demulsifiers, corrosion inhibitors, friction reducers, clay stabilizers, scale inhibitors, biocides, breaker aids, mutual solvents, alcohols, surfactants, anti-foam agents, defoamers, viscosity stabilizers, iron control agents, diverters, emulsifiers, foamers, oxygen scavengers, pH control agents, and buffers, and the like.

When referring to concentrations of contaminants in water or to water properties such as pH and viscosity, unless otherwise stated the concentration refers to the concentration of a sample properly taken and analyzed according to standard Environmental Protection Agency (EPA) procedures using the appropriate standard test method or, where no approved method is available, commonly accepted methods may be used. For example, for Oil and Grease the test method identified as 1664A is an approved method. In the event two or more accepted methods provide results that indicate two different conditions as described herein, the condition should be considered to have been met (e.g., a condition that must be "above pH of about 7.0" and one accepted method results a pH of 6.5 and another in pH of 7.2, the water should be considered to be within the definition of "about 7.0").

FIG. 1 illustrates an embodiment of a system for treating contaminated water. The contaminated water may be produced water 120 generated by oil field operations or waste water from some other industrial or residential source. The system 100 is illustrated and discussed below as a continuous flow system. However, in an alternative embodiment some or all of the processes of the system 100 may be operated as batch processes.

In the embodiment shown, the contaminated water is produced water 120 generated from oil, gas or other subsurface extraction operations. In an embodiment, the produced water is contaminated with methanol and boron derived either from natural sources in the subsurface or added as part of the extraction operations.

In an embodiment, the system of FIG. 1 is anticipated to receive produced water having at least about 7,000 milligrams per liter (mg/l) of total dissolved solids (TDS), at least about 10 mg/l of boron, and at least about 500 mg/l methanol, although the system could be used to treat less contaminated water as well. Furthermore, as discussed in greater detail below, the effluent of the system 100 is desired to contain less than about 500 mg/l of TDS, less than about 2 mg/l boron, and less than about 1 mg/l methanol. Preferably, the system 100 can accept any produced water of any quality. In testing, waste water, including produced water with the following ranges of contaminant as provided in Table 1 concentrations, were treated.

TABLE 1

| Parameter | Range |
| --- | --- |
| TDS @ 180 C., mg/l | up to at least 8830 |
| TSS @ 105 C., mg/l | up to at least 141 |
| Turbidity, NTU | up to at least 239 |
| TOC, mg/l | up to at least 1130 |
| COD, mg/l | up to at least 5750 |
| BOD, mg/l | up to at least 1820 |
| pH | up to at least 7.21 |
| Iron, mg/l | up to at least 0.3 |
| Chloride, mg/l | up to at least 4310 |
| Potassium, mg/l | up to at least 59.2 |
| Calcium, mg/l | up to at least 78.5 |
| Magnesium, mg/l | up to at least 9.1 |
| Sodium, mg/l | up to at least 2750 |
| Sulfate, mg/l | up to at least 26 |
| Carbonate, mg/l | ND as $CO_3$ |

TABLE 1-continued

| Parameter | Range |
| --- | --- |
| Bicarbonate, mg/l | up to at least 459 as $HCO_3$ |
| Boron, mg/l | up to at least 11.6 |
| Methanol, mg/l | up to at least 610 |

In an embodiment, the produced water 120 may also be contaminated with slick water and thus may contain friction reducers such as acrylamides. Such contaminants are relevant in that they are hard to remove, foul many treatment operations such as reverse osmosis systems, and inhibit the formation of fracturing gels if the contaminant exists in sufficient concentration in fracturing water.

The system 100 is designed in anticipation that the produced water 120 is likely to contain these contaminants at all times or intermittently.

The system 100 receives the produced water 120 and may temporarily store it, such as in a holding tank, before beginning active treatment. The produced water 120 may be received via truck, pipeline, surface flow or any other suitable method. Produced waters 120 from different sources may also be received and co-mingled immediately or independently treated until the anaerobic treatment stage discussed below. As the system is adapted to treat any type of expected contaminant, this is an advantage over other systems that are tailored to specific water qualities from specific wells or sources.

The produced water 120 may be treated with a gravity separator, such as an API separator as shown, to remove immiscible phases of oil and grease. Gravity separation is well known and any suitable gravity separation system, e.g., API separator design, gunbarrel separator or gravity clarifier, may be used.

The aqueous separator effluent 122 then is transferred to the anaerobic treatment system 104 for anaerobic digestion of contaminants. In an embodiment, an anaerobic pond may be used as the anaerobic treatment system or as part of the anaerobic treatment system 104. Anaerobic ponds are known in the art and refer to a deep pond that maintains anaerobic conditions at depth, except for a shallow (typically less than about 2 feet) surface zone. In an embodiment, some oxygen may be added to water contained in the anaerobic pond through spray evaporation and ambient contact with air, as long as very little dissolved oxygen is achieved below 2 feet of depth to ensure that the conditions at depth remain anaerobic. In an embodiment, other than mixing incidental to the mixing of the effluent 112 with the contents of the anaerobic treatment system 104 vessel, no additional mixing or aeration is provided by the operators.

The anaerobic treatment system 104 treats the water by anaerobic conversion of organic wastes into carbon dioxide, methane, other gaseous end products, alcohols possibly including methanol, and organic acids. Inorganic wastes may also be anaerobically converted. Some separation will occur in the anaerobic treatment system 104 due to precipitation of converted contaminants as well as via settling. In operation, it was noted that anaerobic digestion served at least two beneficial purposes. First, it typically reduced chemical oxygen demand (COD) by 30% or more and usually by at least 50%. However, it notably did not reduce biological oxygen demand (BOD) by very much. Second, anaerobic digestion reduced the ratio of COD to BOD from the initial value (typically around 3:1) to 2:1 or less.

In an embodiment, the water is treated in the anaerobic treatment system 104 based on residence time. A mean residence time of at least about 50 days has been found to be effective. Larger mean residence times are also effective. In an alternative embodiment, an alternative benchmark or combination of benchmarks may be used to determine if sufficient treatment has occurred, such as a targeted COD reduction relative to the inlet amount (e.g., at least about 15% reduction, or at least about 30% or at least about 50% reduction criteria) or threshold COD to BOD ratio being achieved. A combination benchmark may include a minimum of 50 days residence time and any other benchmark such as COD concentration.

Effluent 124 from the anaerobic treatment system 104 is transferred to an aeration system 106, which may also be referred to as an aerator 106. The aeration system 106 actively aerates the water to allow the biological digestion of contaminants in the water over time. In an embodiment, the aeration system 106 treats the water for a mean residence time of at least about 5 days with mean residence times of 5 to 10 days being one treatment target. During treatment, the dissolved oxygen of the system is monitored and the aeration is adjusted to maintain a dissolved oxygen concentration above at least 50% of the solubility limit of oxygen in water at the aeration system 106 temperature, preferable above 75% of the solubility limit and more preferable above 90% of the solubility limit. However, the target dissolved oxygen concentration used may be balanced against the cost of providing the aeration and current throughput needs of the system.

In an embodiment, no supplemental nutrients for bioremediation are added in the aeration treatment step. The amount of aeration may be controlled based on measurement of dissolved oxygen of the water in the aeration system 106. Aeration may also be controlled based on the effectiveness of the flotation treatment and water quality of the flotation treatment effluent 128. Submerged combustion heaters, or other heat sources, may be used to raise water temperature as desired, such as in the winter to prevent water freezing if the aerator 106 is an outdoor pond.

In addition to biological digestion, it is believed that some oxidation or other aerobic conversion of some contaminants occurs in the aeration system 106. In an embodiment, a benchmarks to determine proper aeration may include a minimum residence time at a specific rate of aeration and temperature, a reduction of BOD to below a target threshold (e.g., less than about 1300 mg/l, or more preferably less than about 1000 mg/l), a reduction of sulfate to below 10 mg/l sulfate, a reduction of 50-75% of the input concentration of sulfate in the anaerobic treatment system effluent 124, and/or a reduction in barium to less than 1 mg/l. However, as mentioned above, sufficient aeration is primarily indicated by the effectiveness of the flotation treatment and water quality of the flotation treatment effluent 128.

In the aeration system 106, aerobic digestion of trace metals occurs helping to clarify these compounds and serves many beneficial functions. First, aerobic digestion of trace metals occurs helping to clarify these compounds. This was evidenced by analyses of sludge taken with insufficient aeration and sufficient aeration showing that insufficient aeration resulted in leachable barium (determined by the TCLP analysis) being found in the sludge whereas, under conditions of proper aeration, leachable barium was reduced below the detection limit.

Experimental data suggest that the aeration step does reduce the COD and BOD of the water being treated, but, without being bound to any particular theory, the aeration step also appears to cause a change in the nature of the COD which increases the effectiveness of the flotation system 108 in removing contaminants. This was evidenced by experiments in which insufficiently aerated effluent from the aeration system 106 was transmitted to the flotation system 108 and it was found that the flotation system's ability to coagulate and separate contaminants was drastically reduced. Notably, another effect of insufficient aeration observed during testing was that the resulting COD that was passed by the DAF 108 fouled the bioreactor 112. Proper aeration eliminated this fouling. Without being limited to a particular theory, it is believed that the COD in produced water contaminated with frac flow back water is at least in part due to long chain acrylamide polymers, fragments of frac gel and other stimulation chemicals, that can be floated out in the DAF, but only after conversion by the digestion operations 104, 106.

In an embodiment, an aeration pond is used as the aeration system 106. Aeration ponds are known in the art. An aeration pond is typically a large, shallow earthen basin provided with some means for actively aerating the water contained in the pond. Types of active aeration using air include sprayers that spray the water into the air and forced air injection via diffusers submerged in the pond attached to floating aerators. Many other aeration means are known in the art; any suitable means for aerating the water may be used.

Aeration system effluent 126 is transferred, with heat as needed for proper operation, to a flotation separator 108. The flotation separator 108 separates solid particles from the aqueous phase by introducing fine gas bubbles into the aqueous phase. The bubbles attach to the particulate matter and the buoyant force of the combination is great enough cause the particle to rise to the surface and subsequently be skimmed off or otherwise mechanically separated from the aqueous phase.

Flotation separators 108 are well known in the art. In experiments, a dissolved air flotation (DAF) separator was used to float and separate particulates from the aqueous phase, however there is no reason to believe that other flotation separators, such as air flotation or vacuum flotation systems, may not also be effective. In embodiments that utilize a DAF separator, any suitable DAF design, now known or later developed may be utilized. For example, a three vessel DAF in which coagulant is added in the first vessel, the flocculant is added in the second vessel and the third vessel is the actual flotation chamber in which air is added and separation occurs.

Furthermore, any DAF additives may be used as determined to be experimentally suitable in increasing the effectiveness of the DAF separator in removing contaminants. Commercially available coagulants were used to assist the coagulation and increase the performance of the DAF. In an embodiment, Ashland Chargepac 55 with a dose rate between 100 and 200 ppm was used as the coagulant and flocculant polymer was mixed from Ciba Magnafloc 336 and then diluted to a final dose rate of 2 to 7.5 ppm. Preferably, the DAF separator is operated above 35 degrees F. and more preferably at about 55 degrees F. In an embodiment, the DAF separator is operated as necessary to obtain an effluent 128 with an NTU level of less than about 10 NTU.

In the embodiment shown, the aqueous effluent 128 of the flotation separator 108 is further clarified by passing the effluent 128 through a filtration system 110. Additionally, the effluent 128 may be monitored, such as via a turbidity meter, conductivity sensor or other monitoring device. If the observed level does not meet the desired level of treatment, the effluent 128 may be recycled to an earlier treatment operation. Furthermore, at any point after the aerobic digestion, a biocide may be introduced to eliminate microbes and promote removal of same, such as in the DAF separator 108 or the filtration system 110 or prior to shipment to a frac system.

In the embodiment shown, a sand filter, nominally effective as a 10 micron filter, was used as the filtration system 110 to achieve a turbidity of less than about 5 NTU and preferably less than about 1 NTU. Other filtration designs may also be used. Effluent 128 from the DAF separator 108 may be feed via gravity through the filters 110 to a lift station that transfers water to one or more intermediate surge tanks. In order to achieve the desired level of treatment, one or more separate filters may be utilized in series or in parallel. In an embodiment, each sand filter may be equipped with a sight glass to show the operator how much head is developing in the filter and also with an inline turbidity meter to directly measure filter performance. When the feed water level in the filter reaches the high tank level switch a backwash cycle may be initiated by a programmable logic controller (PLC) that monitors operation of the filters or the system as whole. The back wash cycle may also be triggered manually or based on the readings of the turbidity meter. Back wash water and overflow from the sand filter inlet may be recycled to any prior treatment operation as desired by the operator.

The effluent 130, 132 of the filtration system 110 is suitable for use as a fracturing water even though in experiments it still contained significant concentrations of COD, total organic carbon (TOC), TDS, and biological oxygen demand (BOD). Its use as a fracturing water was evidenced by the ability to gel sufficiently when combined with polymers to create a high-viscosity fracturing gel. Without being bound to a particular theory, it is believed that trace amounts of the friction reducers from slick water impair the gelling reaction. These friction reducers are also very difficult to remove using either anaerobic or aerobic treatment alone and also difficult to remove without the use of flotation. Indeed, it is believed the combination of anaerobic, aerobic and flotation treatment operations is the most effective way of reclaiming produced water that is unsuitable for use as fracturing water and convert it into water that is suitable for use as a fracturing water.

Typical and target values of contaminant concentrations for fracturing water 130, 132 obtained from the system 100 are provided below in Table 2.

TABLE 2

| Parameter | Range | Target |
|---|---|---|
| TDS @ 180 C., mg/l | 9,000-16,000 | <10,000 |
| TSS @ 105 C., mg/l | 0-100 | <75 |
| Turbidity, NTU | 0-5 | <1 |
| TOC, mg/l | 400-800 | <700 |
| COD, mg/l | 1000-3000 | <2000 |
| BOD, mg/l | 500-1500 | <1000 |
| pH | 6.5-8 | 7-7.5 |
| Iron, mg/l | 1-10 | <5 |
| Chloride, mg/l | 5,000-10,000 | <6,000 |
| Potassium, mg/l | 100-500 | <300 |
| Calcium, mg/l | 50-250 | <150 |
| Magnesium, mg/l | 10-100 | <25 |
| Sodium, mg/l | 2000-5000 | <3000 |
| Sulfate, mg/l | 40-200 | <50 |
| Carbonate, mg/l | 0-100 | <25 |
| Bicarbonate, mg/l | 100-1200 | <800 |
| Boron, mg/l | 0-20 | <15 |

In the embodiment shown in FIG. 1, in addition to generating water suitable for reuse as fracturing water, additional treatment operations are provided that treat the produced water to a quality sufficiently clean for discharge to the environment. Thus, the depending on the need for frac water, the system 100 may be operated so that more or less frac water 130 is produced from the produced water 120 stream. Any surplus of unused frac water 130 may then be treated by the remaining portions of the system 100 to a water quality that allows the water to be discharged to the environment.

Treatment of the frac water 130, 132 to a quality suitable for discharge to the environment requires that the system 100 address methanol and boron concentrations. Methanol is often a contaminant in produced water. In addition, anaerobic digestion may produce methanol from the digestion of guar gels. Testing has shown that in the system shown in FIG. 1 while some methanol reduction (e.g., at the top of the pond) may occur under certain conditions during the anaerobic treatment operation, methanol may be treated significantly during the aeration treatment. However, the aeration system 106 as described can not be depended to sufficiently treat all of the methanol in the produced water. This variability may be due to lack of nutrients, composition of the particular inlet produced water being treated or the ambient weather conditions under which the aeration treatment is being operated.

In the embodiment shown, the system 100 further provides for the effluent 132 of the filtration operation to be transferred to one or more bioreactors 112, 114 for the biological digestion of the effluent 132. Biological digestion of the effluent 132 drastically reduces the concentration of the methanol in the water. In an embodiment, the biological digestion of the effluent 132 is performed for a duration sufficient to reduce the methanol to below the target discharge limit or alternatively to a level at which the methanol can no longer be detected.

In the embodiment shown, two stages of biological digestion are performed. First, a bioreactor 112 may be used to perform the majority of the biological digestion. In an embodiment, the bioreactor may be an enclosed vessel, such as a steel tank with internal epoxy coating and standard tank roof with appropriate vents. Coarse bubble diffusers may be mounted on the bottom of the tank with air supplied by compressors. The bioreactor 112 may or may not be heated as needed to maintain a healthy biological environment for digestion. Additionally, nutrients may be added, such as gaseous ammonia for nitrogen and phosphoric acid for phosphorous, as necessary. In an embodiment, a residence time may be chosen so that methanol is completely eliminated or reduced to a desired concentration in the bioreactor 112. The design and operation of bioreactors are well known in the art and any suitable design may be utilized as part of this operation.

In the embodiment shown, a second, and optional, stage of combined biological digestion and filtration is provided in which the effluent 134 of the bioreactor 112 is transferred to a membrane bioreactor (MBR) 114 as shown. The MBR 114 provides additional biological digestion as well as removing by filtration some contaminants contributing to TOC concentrations in the water 134. Cleaned water (permeate 136) is extracted through the membranes of the MBR 134. In an embodiment, reject from the MBR 114 may be returned to the bioreactor 112 for additional digestion or to any other prior treatment stage. Any suitable membrane bioreactor design may be utilized, for example a hollow fiber membrane bioreactor such as that sold by ZENON under the trademark ZEE-WEED is suitable for use as the MBR 114.

Permeate 136 of the MBR 114 is transferred to an RO system. In the embodiment shown, a reverse osmosis (RO) system 116 is used to filter the remaining TOC, TDS and other contaminants from the permeate 136 to a level acceptable for discharge, except boron. RO systems 116 are well known in the art and any design, now known or later developed, may be utilized.

Notably, where the pH of the water is not raised, such as for the purposes of precipitating out contaminants, in the prior operations such as is necessary in the HERO process. In an embodiment, there may be some minor reduction of pH in order to maintain the proper conditions within the bioreactor. This, however, does not cause the precipitation of any contaminants, but rather increases the solubility of some contaminants. The pH of the RO permeate 138 will be dictated primarily by the pH of the produced water 120. Thus, the pH of the RO permeate 138 will generally be much lower than the permeate of the RO in a HERO process. Preferably the RO permeate 138 in the system 100 will be less than about 10.0, still yet less than about 9.0 and even more advantageously less than about 8.0 and greater than about 6.5.

By avoiding lime softening, the production of waste solids by the system 100 is significantly lower in comparison. Other than solids derived from the original contaminants in the produced water feed, the major source of solids generated as a result of the treatment operations is due to the use of liquid coagulant in the DAF separator. This represents a significant cost savings over systems and processes that actively adjust the pH through chemical addition as part of the treatment.

However, because of the pH range at which the RO 116 is operated as described above, boron will not be removed from the water by the RO system 116 in quantities sufficient to meet the desired discharge concentration. In experimental analyses, MBR effluent 136 contained roughly the same concentration of boron as the produced water 120. The RO system 116 is expected to pass a significant portion of the boron in the stream—a portion that is expected to be beyond the limits necessary to discharge the boron to the environment.

In the system 100 of FIG. 1, boron is removed from the RO permeate 138 by means of a boron-selective treatment system 118. In an embodiment, the boron selective treatment system 118 is an ion-exchange resin adapted to optimally remove boron from an otherwise relatively clean aqueous stream. One example of such a resin suitable for use in the systems described herein is that offered by Dow Chemical under the trade name of XUS-43594.00, now alternately referred to under the trade name BSR1, which is marketed as a uniform particle size weak base anion exchange resin for selective boron removal. Other boron-selected resins known in the art include the product MK-51 sold by SYBRON and S-108 sold by PUROLITE. Other systems that are effective for removing boron may also be used, whether now known or later developed. In fact, because the RO permeate 138 is substantially clean except for the boron, any effective boron removal system may be used without worry of fouling or degradation due to other contaminants.

Effluent 140 of the boron-selective treatment system 118 will be of sufficient quality to be discharged to the environment. Exemplified target values of contaminant concentrations for effluent 140 from an embodiment of the system 100 are provided below in Table 3. If, upon testing, the values are outside of the target ranges, the effluent 140 may be recycled to one of the treatment operations until the effluent 140 quality meets the discharge requirements.

TABLE 3

| Parameter | Range |
| --- | --- |
| TDS | <500 mg/l |
| TOC | <5 mg/l |
| Boron | 1-2 mg/l |
| pH | 6.5-9.0 |
| Oil & Grease | <10 mg/l |
| Radium 226 | <60 mg/l |
| Chlorides | <230 mg/l |

Various waste streams other than the primary aqueous streams discussed may be disposed in any suitable manner. For example, reject from the RO system 116 may be used as backwash for prior treatment systems, shipped to the oilfield for use as frac water, returned to the treatment flow for reprocessing and further concentration or disposal via injection well. As a further example, in embodiments using an ion-exchange resin for boron removal, the boron-laden regenerate from the ion-exchange regeneration may be blended with RO reject fluid to neutralize the regenerate and injected in the disposal well.

In an embodiment, some or all of the operations of the treatment system may be automated used process controllers, automated transfer pumps, flow control valves, sensors and other equipment as is known in the art.

The fracturing water 130 output of the system 100 may be stored in holding tanks prior to transfer to a fracturing gel production system via pipeline or truck to a wellhead or other location where fracturing chemicals are added to generate fracturing gel. Similarly, the boron-selective treatment system effluent may be discharged to a holding tank for confirmation testing prior to discharge.

Those skilled in the art will recognize that the methods and systems of the present disclosure may be implemented in many manners and as such are not to be limited by the foregoing exemplary embodiments and examples. In other words, functional elements being performed by a single or multiple components, may be performed in various combinations. In this regard, any number of the features of the different embodiments described herein may be combined into single or multiple embodiments, and alternate embodiments having fewer than or more than all of the features herein described are possible.

While various embodiments have been described for purposes of this disclosure, various changes and modifications may be made which are well within the scope of the present invention. For example, between one or more of the treatment operations described herein, transfer pumps, surge tanks, control valves, heaters, and other equipment may be provided to assist the efficient operation and maintenance of the system and to provide for various contingencies such as surges, cleaning operations, recycling of flow, bypassing of operations, and low or high ambient temperatures. As a specific example, water being transferred between any two operations may be analyzed and recycled to a previous stage if certain contaminant concentrations are out of a predetermined desired range. Additionally, if the system is operated as a continuous flow system, surge tanks and overflow capacity may be provided at different points within the system to allow for the system throughput to managed as necessary to obtain the proper water quality at each stage of treatment.

Numerous other changes may be made which will readily suggest themselves to those skilled in the art and which are encompassed in the spirit of the invention disclosed and as defined in the appended claims.

What is claimed is:

1. A method for generating fracturing water from produced water comprising:
   transferring produced water contaminated with at least one contaminant selected from a friction reducer and a fracturing polymer into an anaerobic pond;
   holding the produced water in the anaerobic pond for at least a first mean residence time;
   transferring anaerobic pond effluent to an aeration pond;
   aerating the anaerobic pond effluent in the aeration pond for a second mean residence time;

transferring aeration pond effluent from the aeration pond to a dissolved air flotation treatment system;

floating the aeration pond effluent with the dissolved air flotation treatment system to generate a floated aqueous effluent and a separated solids effluent; and providing the floated aqueous effluent as fracturing water to a fracturing fluid generation system.

2. The method of claim 1 further comprising:

separating an immiscible hydrocarbon phase from the produced water prior to transferring the produced water into the anaerobic pond.

3. The method of claim 1 further comprising:

receiving separate streams of produced water of different qualities from different sources, wherein at least one received stream is contaminated with at least one contaminant selected from a friction reducer and a fracturing polymer; and transferring each of the separate streams to the anaerobic pond for combined treatment.

4. The method of claim 1 wherein the first mean residence time is about 50 days or more.

5. The method of claim 1 wherein the first mean residence time is a period of time sufficient to reduce the ratio of chemical oxygen demand to biological oxygen demand to about 2-to-1.

6. The method of claim 1 wherein the floating further comprises:

operating the dissolved air flotation system sufficiently to achieve a floated aqueous effluent with an NTU level less than about 10 NTU.

7. The method of claim 1 further comprising:

gelling the floated liquid effluent to generate fracturing gel.

8. The method of claim 6 further comprising:

filtering the floated liquid effluent sufficiently to reduce the NTU level to less than about 5 NTU prior to providing floated liquid effluent as fracturing water.

9. The method of claim 1 wherein the produced water is contaminated with a concentration of acrylamide sufficient to render the produced water unsuitable for use as fracturing water.

10. A method for removing contaminants from produced water that inhibit the gelling of fracturing fluid when the produced water is used as fracturing water comprising:

anaerobically digesting the produced water containing the contaminants for a first period of time;

after anaerobically digesting the produced water, aerating the produced water for a second period of time;

after aerating the produced water, treating the produced water in a dissolved air flotation system; and filtering floated effluent of the dissolved air flotation system to generate a filtered water, wherein the filtered water is suitable for use as fracturing water.

11. The method of claim 10 further comprising:

mixing the filtered water with one or more polymers to generate a fracturing fluid having a viscosity greater than about 50 centipoise when injected; and injecting the fracturing fluid into the subsurface via a well.

* * * * *